United States Patent [19]
Tomita et al.

[11] 3,821,441
[45] June 28, 1974

[54] METHOD FOR MAKING A FROZEN CAKE
[76] Inventors: Tsutomu Tomita, Yachiyo;
Masahiko Mizukoshi, Funabashi;
Shinichi Ogiwara, Funabashi;
Ayahiko Maeda, Funabashi, all of Japan
[22] Filed: May 8, 1972
[21] Appl. No.: 250,952

[30] Foreign Application Priority Data
May 10, 1971  Japan.............................. 46-30935

[52] U.S. Cl................. 426/343, 426/159, 426/510, 426/524
[51] Int. Cl............................................. A21d 13/08
[58] Field of Search........ 99/92, 192 BBD; 426/510, 426/343, 524

[56] References Cited
UNITED STATES PATENTS
173,211  2/1876  Chichester......................... 426/510
1,702,854  2/1929  Simonds............................. 426/510
3,718,483  2/1973  Davis et al............................. 99/92

OTHER PUBLICATIONS
Meta Given's "Modern Encyclopedia of Cooking" Vol. 1, J. G. Ferguson & Associates, Chicago, 1949, pages 592–596.
Simpson, "The Frozen Food Cookbook" Avi Pub. Co. Inc. Westport, Conn. 1962, pages 166, 167, 171–173.

*Primary Examiner*—Raymond N. Jones
*Attorney, Agent, or Firm*—Woodhams, Blanchard and Flynn

[57]  ABSTRACT

A frozen cake article is made by kneading together as principal ingredients, egg, sugar and wheat flour, together with cake making adjuncts, to form a dough and then steaming the dough in a steaming vessel to obtain a steamed cake and finally freezing the steamed cake at a temperature of −50°C. to −10°C.

2 Claims, No Drawings

METHOD FOR MAKING A FROZEN CAKE

BACKGROUND OF THE INVENTION

The present invention relates to a method for manufacturing a frozen cake product by quickly freezing a steamed cake made by steaming cake dough.

The methods of manufacturing such baked cakes as sponge cake, yellow layer cake, and pound cake have hitherto been known. However, cakes manufactured by such baking methods lose a considerable amount of moisture in the body thereof by evaporation as a result of baking at high temperatures, and consequently the baked cakes are fragile, become stale quickly, and are not suitable for long-term preservation. It also is known to preserve these kinds of baked cakes by freezing them; however, such cakes after defrosting are hard and lack flavor, and they have extremely poor platability (melting in mouth, smoothness, etc.)

SUMMARY OF THE INVENTION

We have discovered the present invention as result of study of a method by which the above-mentioned shortcomings can be eliminated and fresh and high quality cakes can be provided anywhere at any time.

The present invention provides a method of manufacturing frozen cakes which comprises kneading the compounding ingredients for cake mainly consisting of egg, sugar, and wheat flour to prepare a dough, subsequently subjecting said dough as a whole or after cutting same to the desired size to steaming in a steaming vessel, and then quickly freezing the obtained steamed cake by cooling same to a temperature in the range of −50° to −10°C. The cake after defrosting is characteristically soft, moist, and melts easily in the mouth and is remarkably good in flavor.

The preparation of cake dough in the present invention is carried out by kneading the principal cake-making materials, namely, egg, sugar, and wheat flour and adding thereto one or two or more of other cake-making materials such as oil and fat, baking powder, spices, skim milk, emulsifier, water, etc.

In the present invention, the cake-making recipe is not critical and any known cake-making recipe may be used. Typical known cake recipes are as shown in Table 1.

Table 1

| Kind of cake Material | Typical Cake Recipe (parts by Weight) | | | |
|---|---|---|---|---|
| | Sponge cake | High ratio type yellow cake | Pound cake | Other cake |
| Wheat flour | 100 | 100 | 100 | 100 |
| Sugar | 100 | 140 | 100 | 80–140 |
| Egg | 125 | 60 | 100 | 20–200 |
| Oil and fat | — | 55 | 80 | 20–100 |
| Water (or milk) | 20 | 105 | — | 0–100 |

To make cakes which are good in all of flavor, appearance, and texture, a definite balance between the materials is necessary as shown in the above Table, and the compounding recipe is approximately standardized according to the kind of cakes to be produced. Water or milk softens and moistens moderately the texture of cake, and sugar and fat and oil are effective in making the cake readily meltable in the mouth. Particularly in the case of frozen cakes, it is a necessary condition to obtain platability (melting in mouth, smoothness, etc.) and moderate moistness. It is therefore not normally expected that sponge cakes which normally contain no fat or oils or pound cakes which normally contain no water or milk, or containing same in a small amount, can exhibit the aforesaid properties. We, however, have completely removed such apprehension by employing a steaming process instead of a conventionally used baking process. The cake processed by the steaming process according to the present invention is sufficiently platable (melting in mouth, smoothness, etc.) and moderately moist even when it contains a small amount of fat and oil, water, or milk, or sugar. When the cake is defrosted after quick-freezing, it exhibits a good cake characteristic, which is not inferior to that of a freshly steamed cake.

As the fat and oil which can be mixed with the cake-making materials wheat flour, sugar, egg, etc., as the occasion demands, there can be mentioned cotton seed oil, purified corn oil, lard, beef tallow, and other so-called vegetable and/or animal fats and oils. In particular, the use of hydrogenated fats and oils such as hardened cotton seed oil, hardened palm oil, etc., is preferable from the viewpoint of oxidation stability. Margarines and shortenings, which are products obtained by compounding butter or fat and oil, are also suitable.

As an emulsifier to be added to the fat and oil in the present invention, there can be used one or two or more of known emulsifiers for foods, such as propylene glycol fatty acid ester, sorbitan fatty acid ester, glycerine fatty acid ester, polyglycerol fatty acid ester, polyoxyethylene sorbitan fatty acid ester, lactomonoglyceride. The fatty acid of the emulsifiers of the fatty acid ester type is preferably a saturated fatty acid with carbon number range of 14 to 22.

To 100 parts by weight of oil and fat there is added about 1 to 20 parts by weight of the emulsifier, depending on the kind of emulsifier used. An emulsified fat can also be used which consists chiefly of fat and oil, emulsifier, and water.

After the cake dough has been prepared by kneading the cake materials by conventional methods such as the sugar batter method, the flour batter method, and the all-in-mix method, said dough is placed in a cake mold to steam as a whole or is cut into the desired size in case a large amount of dough is prepared as is the case in industrial scale production. The steaming process is conducted using heated steam or high pressure heated steam in a steaming vessel.

As a cake mold for holding the cake dough there can be used various types of molds, such as one made of aluminum foil, thin metal sheet, plastic, paper, or wood. Molds of aluminum foil are generally suitable. As the steaming vessel or equipment, conventional steaming vessel can be used. A normally used steam vessel consists of a body, a lid and a perforated plate placed within the body. Water is put in beneath the perforated plate and cake molds filled with the cake dough are placed on the plate. The vessel is heated, for example, by gas and the highly saturated steam generated from boiling water by gas heat contacts directly with the cake dough and the molded dough rise to cake form. The temperature period of steaming should be sufficient for the molded dough to rise to cake form and the steaming is usually carried out for from 10 to 40 minutes at atmospheric pressure. Further, the steaming can also be carried out by means of steam under pressure. As a steaming equipment in which steam under high pressure is used, high pressure heated steam cookers, such as the ones described in "Professional food preparation" by Margaret E. Terrel (John Wiley & Sons, Inc. 1971) page 118, can be used.

The steaming or steam cooking process can be performed in batches, but on an industrial scale it can be accomplished by using a continuous steaming apparatus of the belt conveyor type.

The steamed cake obtained after the steaming process is quickly frozen at temperatures in the range of −50° to −10°C, preferably −40° to −20°C. When the cake is frozen at temperatures lower than −10°C, the cake does not have an abnormal odor and it does not deteriorate due to oxidation. Cakes can be frozen at temperatures lower than −50°C, but this requires a large amount of freezing agent and therefore is not economical. In order to make the moisture in the texture of cake form ice crystals as minute as possible to avoid damage to the texture, it is desirable to freeze the cake quickly. For quick freezing, liquid nitrogen, liquid carbon dioxide, and other conventional freezing agents are used.

Rack-type freezing devices, tunnel-type freezing devices, and the like are used for freezing. In the case of mass-production, it is preferable to use a continuous mechanized type of freezing device which takes out the frozen products continuously for storage.

The frozen cake can be supplied for eating in the defrosted form. It is tasteful even if it is eaten in half-defrosted state.

Various defrosting media can be used to defrost the frozen cake. That is to say, media higher in temperature than the frozen cake (for instance, air, water, etc.) are used. In case defrosting media is not used, defrosting can be accomplished by an electronic oven or high frequency electric induction heating.

Frozen cakes manufactured according to the present invention have good characteristics after defrosting.

As advantages of frozen cakes made according to the present invention, the following are cited:

1. The cake itself is moist and soft, and has a very good palatability (melting in mouth, smoothness, etc.).
2. The cake is flavorful.
3. It becomes stable at a very slow rate.
4. It is suitable for use in combination with ice cream and pudding, and as a cold cake.
5. As compared with a cake refrigerated after baking, it is moderately moist, and has palatability and flavor, even if the amount of sugar, fat and oil, and water contained is small.

DETAILED DESCRIPTION OF THE INVENTION

Practical Examples of the present invention will be shown below.

EXAMPLE 1

A cake dough was prepared by kneading 1,000 g of wheat flour (soft wheat flour with relatively low gluten content), 1,200 g of sugar, 1,500 g of egg, 300 g of salad oil containing 10 percent by weight of propylene glycol monostearate and 5 percent by weight of glyceryl monostearate, 200 g of water, and 10 g of baking powder in a mixer of 20 quarts capacity for 10 minutes. The obtained dough had a specific gravity of 0.50. The obtained dough was divided into two lots from each of which were taken 300 g samples and filled in circular molds of aluminum furnished with bottoms. One of the dough samples filled in the mold was steamed for 30 minutes in a steam-vessel for domestic use. The other one was baked for 30 minutes at 180°C in an electric oven for making cake and bread, for the purpose of comparision. The thus obtained steamed cake and baked cake were simultaneously quickly frozen at a temperature of −20°C by an ice cream freezer. Both were preserved at −20°C for 30 days, and subsequently defrosted by an electronic range for domestic use and the characteristics of the samples were compared. The result is shown in Table 2.

Table 2

| to the invention | Example according | Comparision example |
|---|---|---|
| | steamed cake after defrosting | Baked cake after defrosting |
| Color tone on surface | Yellowish-white | Brown |
| Interior phase | Homogeneous | Slightly rough |
| Soft-ness* Immediately before freezing | 0.60 | 0.60 |
| After freezing | 0.62 | 0.73 |
| Staleness | Staleness not noticed | Surface became dry, and stale |
| Wetness | Good | Inferior |
| Residual moisture | 35.4 percent | 30.2 percent |
| Flavor | Good | Inferior |

Note)* Softness was measured with the aid of a Baker's Compressimeter by Chiyoda Works. The lower the value, the softer the cake.

EXAMPLE 2

Adopting the compounding ratio shown in Table 1 of sponge cake, high ratio type of yellow cake, and pound cake, steamed cake and baked cake of each were made by the same procedure as in Example 1. As oil and fat, commercially available shortening was used. Said steamed cake and baked cake were quickly frozen at a temperature of −30°C, subsequently preserved for 30 days, and thereafter unfrozen by an electronic range for domestic use.

All of the baked cakes after defrosting exhibited 0.75 in the measured value by Baker's Compressimeter. On the other hand, the steamed cakes after defrosting exhibited 0.62 to 0.65 in the measured value by Baker's Compressimeter. The defrosted baked cakes were all inferior in flavor, dry, and had poor palatability (melting in mouth, smoothness, etc.), but the defrosted steamed cake was flavorful, moist and had good palatability.

The embodiments of the invention in which an exclusive property or privilege is claimed are defined as follows:

1. A method of manufacturing frozen cakes, which comprises
   a. preparing a cake dough by kneading egg, sugar, wheat flour and cake-making adjuncts,
   b. placing the cake dough in a cake mold,
   c. placing said cake mold containing said cake dough in a steaming device, filling said steaming device with saturated steam at atmospheric or higher pressure and contacting said cake dough with said steam, as the sole source of heat applied to said cake dough, until said cake dough rises to cake shape and is cooked by said steam d. then quickly cooling the cooked cake to a temperature in the range of −50°C to −10°C to freeze same.

2. The method of claim 1, in which the steaming is carried out for from 10 to 40 minutes at atmospheric pressure.

* * * * *